United States Patent [19]
Courtois

[11] 4,184,714
[45] Jan. 22, 1980

[54] RECLINING SEAT BACK HINGE

[75] Inventor: Bernard Courtois, Etampes, France

[73] Assignee: Societe Industrielle Bertrand Faure, Etampes, France

[21] Appl. No.: 881,607

[22] Filed: Feb. 27, 1978

[30] Foreign Application Priority Data

Mar. 15, 1977 [FR] France ............................ 77 07657

[51] Int. Cl.² ............................................ A47C 1/025
[52] U.S. Cl. .................................. 297/370; 297/373
[58] Field of Search ............... 297/367, 366, 368–371, 297/379, 373, 355, 363–365; 16/143, 144, 139

[56] References Cited

U.S. PATENT DOCUMENTS

| | | | |
|---|---|---|---|
| 3,479,088 | 11/1969 | Bonnand | 297/373 |
| 3,511,534 | 5/1970 | Turner | 297/373 |
| 3,887,232 | 6/1975 | Dinkel | 297/367 |
| 3,926,474 | 12/1975 | Johndrow et al. | 297/367 X |

FOREIGN PATENT DOCUMENTS

1530519 8/1969 Fed. Rep. of Germany ............ 297/366
2006270 9/1971 Fed. Rep. of Germany ............ 297/366

*Primary Examiner*—Roy D. Frazier
*Assistant Examiner*—William E. Lyddane
*Attorney, Agent, or Firm*—Larson, Taylor and Hinds

[57] ABSTRACT

The invention concerns a seat hinge comprising a first flange integral with the sitting portion carrying a first toothed sector having axis A, a second flange integral with the seat back carrying a second toothed sector having axis B adapted to coact vertically with the first sector and a handle-rotary cam-bearing surface assembly for controlling the vertical movements of the flange. The first flange carries a third toothed sector having axis A diametrically opposed to the first sector and open likewise upwards, and the second flange carries another toothed sector having axis B diametrically opposed to the second sector, likewise open downwards, and adapted to coact with the third sector at the same time as the second sector coacts with the first sector. Preferred application: front vehicle seats.

9 Claims, 4 Drawing Figures

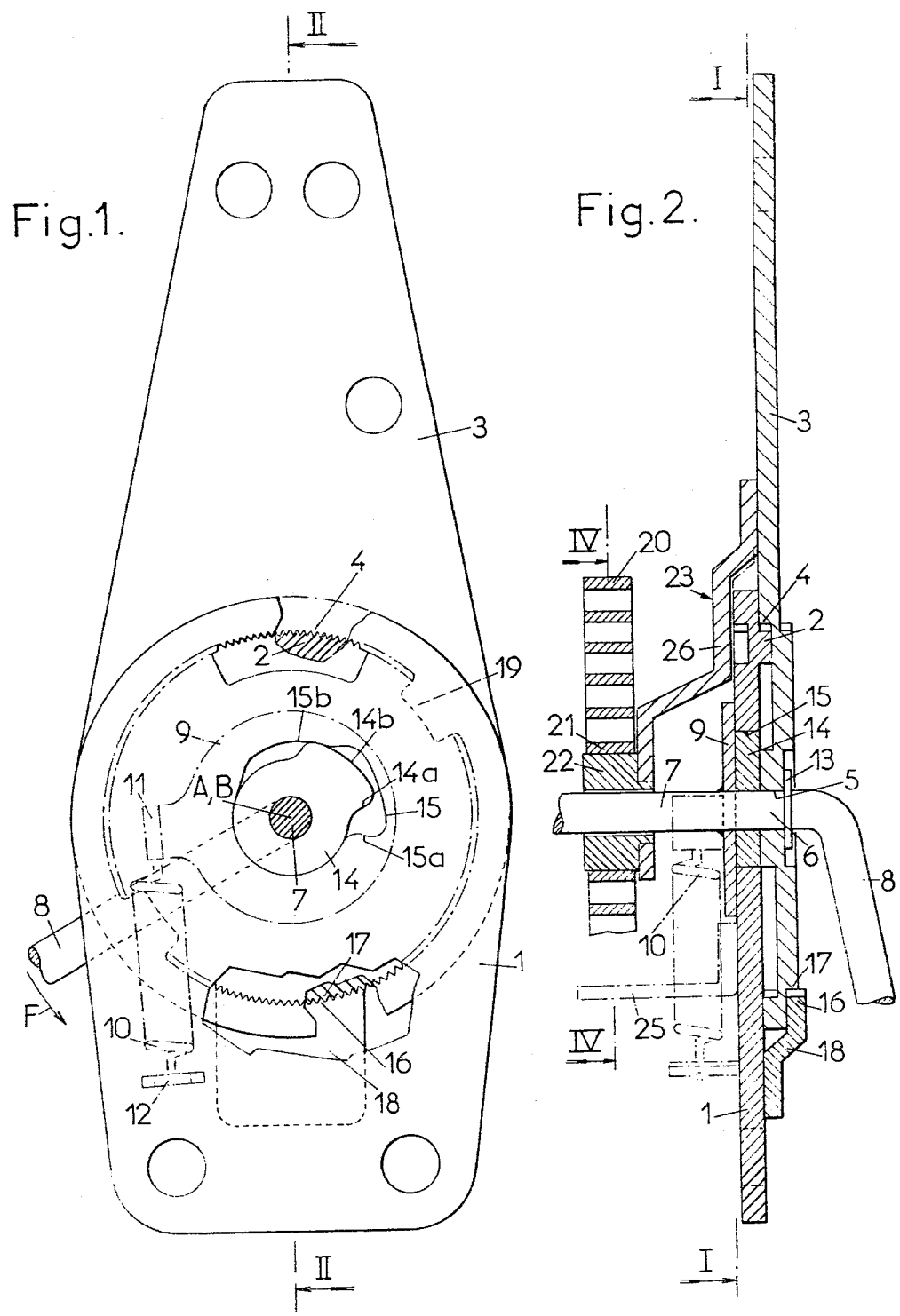

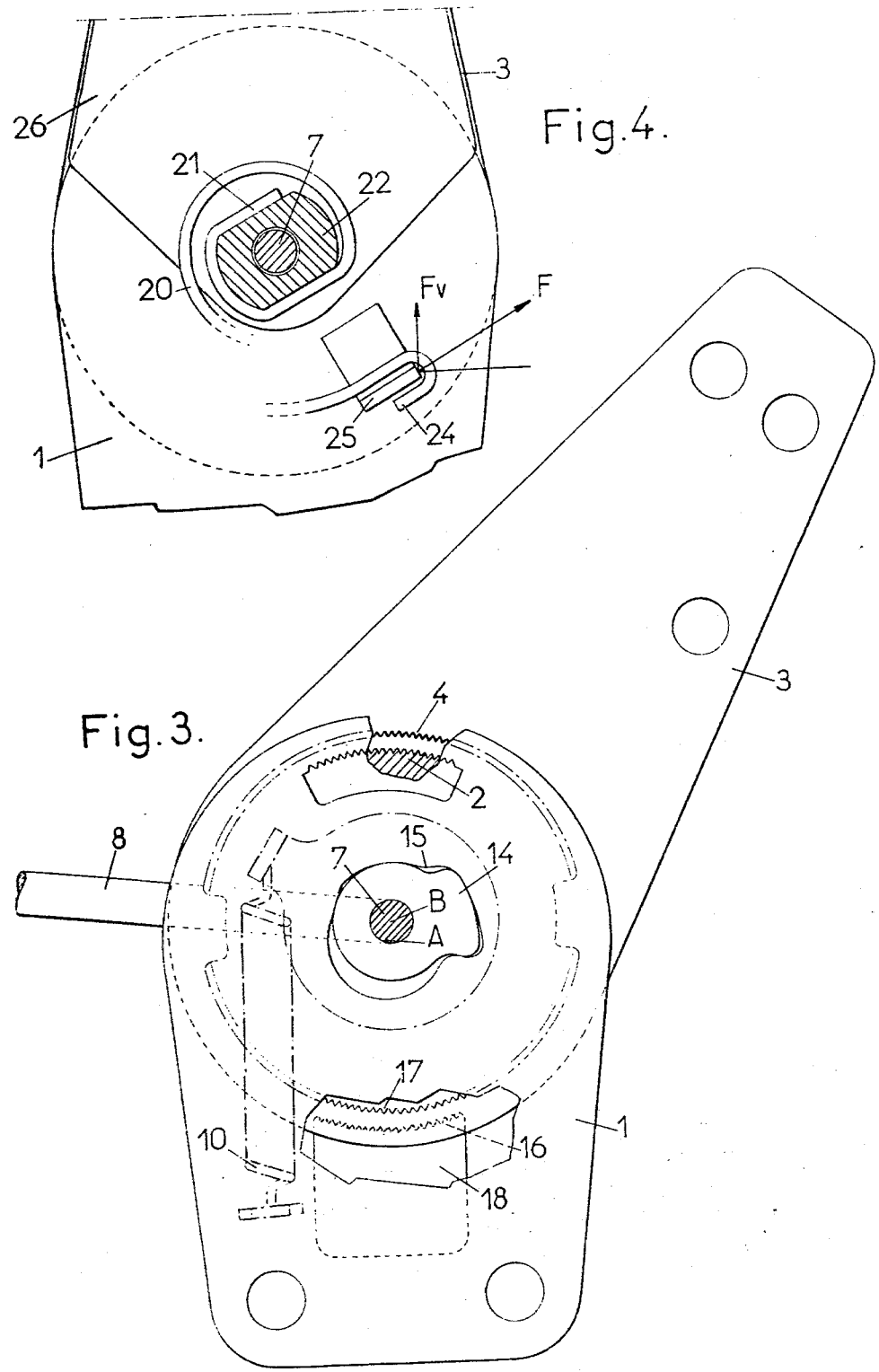

RECLINING SEAT BACK HINGE

The invention relates to seat hinges, i.e. to devices connecting the back of the seat to the sitting portion of a seat so as to allow the seat back to be angularly adjusted about a lower transverse horizontal axis and to be maintained in the chosen angular position.

It relates more particularly, among these hinges, to those comprising: a first flange integral with the sitting portion, carrying a first toothed sector centred on a transverse horizontal axis A; a second flange integral with the seat back, carrying a second toothed sector centred on an axis B connected with the seat back and parallel to axis A, this second sector being adapted to engage with the first sector by simply making the two axes A and B coincide in a generally vertical direction C or slightly inclined from the vertical, said second flange being provided with a circular opening therethrough centred on axis B; a cylindrical hub of revolution jointingly housed in this circular opening and integral with a rotary cam; a control handle accessible to the person sitting in the seat and connected to the cam so that the control of this handle causes rotation of the cam about axis B; a bearing surface provided on the first flange for coacting with the active area of the rotary cam so that the rotation of this cam causes movements of the second flange in direction C; and a spring angularly urging the cam and the handle in the direction corresponding to mutual engagement of the two toothed sectors.

By "toothed sector" is to be understood generally in the present text and in the claims which follow a set of teeth extending over an arc of a circle.

The invention relates more particularly still, because it is in their case that its application seems to offer the most advantage, but not exclusively, among the hinges of the kind indicated, those fitted to vehicle seats, particularly those of these seats mounted in the front places of motor vehicles.

In such hinges it is difficult to completely avoid the play due in particular to inaccuracies of the relative guides, which causes inaccuracies of adjustment, unpleasant noises and in the long run deterioration of the mechanisms. Moreover, the length of the mutually meshing toothed sectors is relatively small seeing that it is limted by the angle of opening of the teeth which are generally triangular in shape, and that this angle of opening must not itself be too great if the angular locking obtained is to be efficient.

The invention has as its aim, among others, to remedy these disadvantages.

Hinges of the kind in question in conformity with the invention are essentially characterised in that they comprise, in addition to the elements indicated above:

a third toothed sector with an axis A carried by the first flange, diametrically opposed to the first sector and open in the same direction as this first sector;

and a fourth toothed sector with an axis B carried by the second flange, diametrically opposed to the second sector and open in the same direction as this second sector, said fourth sector being adapted to engage in the third sector when axes A and B are made to coincide in direction C.

In preferred embodiments, recourse is had moreover to one and/or the other of the following arrangements:

two of the diametrically opposed toothed sectors are formed by respectively an inner sunken section and an outer projecting section of the same circular set of teeth formed by semi-stamping in the corresponding flange, said semi-stamping causing a sunken half set of teeth to appear on one of the two faces of this flange and a projecting half set of teeth on its other face, one of the third and fourth toothed sectors is formed in the free end of a lug carried by the corresponding flange and overlapping a section of the other flange, the hinge is associated with a spiral leaf spring angularly urging the seat back permanently forward, the inner end of this spring being hooked on to a core connected to the second flange and the outer end of this spring being hooked on to a lug carried by the first flange in a zone thereof such that the angular urging exerted by said spring presents a component tending to lift said second flange, the rotary cam and the bearing surface of the first flange with which this cam coacts are of the type described and claimed in commonly assigned U.S. patent application Ser. No. 867,492 filed on Jan. 6, 1978.

The invention comprises, apart from these principal arrangements, certain other arrangements which are preferably used at the same time and which will be more explicitly discussed hereafter.

In what follows there will be described a preferred embodiment of the invention with reference to the accompanying drawings, in a manner of course in no way limiting.

FIGS. 1 and 2 of these drawings show respectively, in a side view along I—I of FIG. 2, with parts cut out and in an axial section along II—II of FIG. 1, a seat hinge constructed in accordance with the invention in its locked position.

FIG. 3 shows the same hinge similarly to FIG. 1 but in its unlocked position.

And FIG. 4 is a partial view of this hinge along IV—IV of FIG. 2.

The hinge considered comprises, on one of the two sides of the seat, a first vertical flange 1 integral with the framework of the sitting portion of the seat, carrying in its upper part a circular sector with outer teeth 2 centred on a transverse horizontal axis A connected with said flange 1, a second vertical flange 3 integral with the framework of the seat-back and having a second circular sector with inner teeth 4 centred on axis B connected with flange 3 and parallel to axis A, the sets of teeth of both sectors 2 and 4, having a generally triangular shape, being adapted to coact by simply making the two axes A and B coincide in a vertical or substantially vertical direction C, said second flange 3 being provided therethrough with a circular opening 5 centred on axis B, a cylindrical piece or member 6 jointingly housed in opening 5, a transverse shaft 7 integral with piece 6 and advantageously formed by a simple axial extension of this piece having the same diameter, as illustrated in FIG. 2, a control handle 8 integral with shaft 7 and easily accessible to the person seated, a plate 9 also integral with shaft 7, a helical tension spring 10 stretched between a point 11 on plate 9 and a point 12 on flange 1 so as to angularly urge said plate, and so hangle 8, in the direction of arrow F, and a disc 13 also integral with above elements 6 to 9, adjacent piece 6 and extending radially beyond this latter so as to slide against flange 3 whilst ensuring a proper axial positioning of this piece and so of shaft 7 in relation to cylindrical opening 5.

Said hinge is also provided with:

a rotary cam 14 angularly integral with piece 6 and so with handle 8, and a bearing surface 15 integral with flange 1 and adapted to coact with cam 14 so that the rotation of this latter causes vertical movements of flange 3 and so, depending on their direction, mutual separation of sets of teeth 2 and 4 (unlocking) or their mutual engagement (locking).

According to an advantageous embodiment which has been described and claimed in the above mentioned U.S. patent application Ser. No. 867,492 (to which reference may be made for further details), bearing surface 15 is formed by the edge of an aperture formed in flange 1, in which is housed cam 14. This edge has in particular a substantially horizontal section 15a, and the side 14a of a toothed shape excentric portion of the cam bears against this section, during rotation of this cam, to cause rocking of said cam about the thus defined support zone. Moreover, complementary surfaces 14b and 15b in the arc of a spiral forming respectively part of the cam and of the edge of the aperture enable the hinge to be locked by jamming in its locked position.

This being said, according to the invention the hinge considered comprises:

a third circular toothed sector 16 with axis A carried by flange 1, and a fourth circular toothed sector 17 with axis B carried by flange 3 and adapted to coact with the third sector 16 by making axes A and B coincide, i.e. by lowering flange 3.

The characteristics of these third and fourth sectors are the following:

each of them is diametrically opposed in relation to the other circular toothed sector carried by the same flange, the set of teeth of each sector opens in the same direction as the other sector carried by the same flange: in the present case, the sets of teeth of the first and third sectors 2 and 16 both open upwards and those of the second and fourth sectors 4 and 17 both open downwards.

It follows from these two characteristics that if the teeth of one sector are of the "inner meshing type", the teeth of the sector carried by the same flange is of the "outer meshing" type, and conversely: in the present case, it is the second and third sectors 4 and 16 which are of the "inner" type.

It is not indispensable for the radius common to both the latter sectors to be identical with that of the first two sectors, but it is preferable, and this is the case in the illustrated embodiment.

In this embodiment:

the first sector 2 is formed by the projecting portion of a semi-stamped area in flange 1, the third sector 16 is formed in the edge, turned upwards, of a lug 18 added, particularly by welding, to flange 1, said lug being arranged so as to jointly overlap the circular base of flange 3, thus contributing to ensuring the proper axial positioning of this flange, and the two other sectors (second 4 and fourth 17) are formed by two sections of the same circular set of teeth semi-stamped in flange 3 and appear half sunken on one of the faces of this flange and half projecting on the other face, the two sections in question being respectively an upper internal section of the sunken half set of teeth and a lower external section of the projecting half set of teeth.

The angular extent of the meshed sets of teeth is substantially the same at the top and at the bottom, i.e. respectively for the two first sets of teeth and for the other two.

So as to ensure proper engagement between the two sets of teeth in all the angular positions of flange 3, after relative movements of the sets of teeth which are still substantially vertical, it is the two fixed sets of teeth 2 and 16 which have a limited angular extent, e.g. of the order of 45°, the middle of each one of these sets of teeth being straight above or straight below axis A.

Each of the other two sets of teeth 4 and 17 extends over almost a semi-circle, with at is ends breaks forming end-of-travel stops 19.

There exists on each side of the seat a mechanism of the type which has just been described but the transverse shaft 7 passes through the sitting portion of the seat over the whole of its width and is common to the two mechanisms so that these latter may be controlled from one and the same handle 8.

The operation of the hinge which has been described above is the following.

In the normal rest or locked position, handle 8, released, is urged by spring 10 in the direction of arrow F, towards its angular position in which flange 3 is lowered to the maximum by the cam 14-bearing surface 15 assembly: the second and fourth sectors 4 and 17 of this flange 3 are then fully meshed in the first and third sectors 2 and 16, respectively (see FIGS. 1 and 2).

To unlock the hinge, it is sufficient to rotate handle 8 in the direction opposite that of arrow F, which lifts flange 3 and the seat back which is integral therewith while moving, at the top, second sector 4 away from the first 2 and at the bottom, the fourth sector 17 away from the third 16.

The seat back is then free to pivot about its axis B and the person seated can adjust the slope thereof to his liking by leaning more or less heavily on this seat back with his back, against the return force of a spring 20 (to which we will come back later on).

The subsequent simple release of handle 8 causes it to be returned to its intitial angular rest position, under the return force of spring 10 and a new engagement of the facing toothed sectors, under the joint effect of the cam 14-bearing surface 15 coaction and the weight of the seat back.

We can thus observe, according to the invention, a double meshing, one above the hinge axis, the other below.

This double meshing presents multiple advantages in relation to a simple meshing and in particular the following:

it ensures automatic cancelling of the play in the hinge: in fact the two meshings oppose each other in this sense that, for example, any horizontal play created possibly at shaft 7, or more exactly at piece 6, between the mobile flange 3 and the fixed flange 1, could cause a small horizontal movement of said shaft and so a small rocking of said flange about the meshing zone within the hypothesis of a simple meshing, whereas such a rocking is impossible with a double meshing, the directions of the rocking that each meshing would individually make possible being contrary to each other; a similar observation could be made in so far as possible play at one of the two meshings is concerned, which cannot cause rocking of flange 3 seeing that it would have to be effected at one and the same time about shaft 7 and the other meshing;

the above double meshing allows furthermore the total length of the enmeshed sets of teeth to be doubled for a given radius of these sets of teeth, which ensures a double locking efficiency for these sets of teeth of a given profile, or else makes possible the use of finer and/or more open teeth, without reduction of efficiency etc.

The return spring 20 urging the seat back forwards is advantageously formed by a spiral leaf spring whose inner end 21 is hooked on to a central core 22 provided with flats and mounted loose on shaft 7 and interconnected with flange 3 by means of a lug 23.

The outer end 24 of this spring 20 is hooked on to a lug 25 integral with flange 1.

The position of this lug in relation to axis B is chosen so that the force F (FIG. 4) applied angularly by spring 20 on flange 3 has a vertical rising component $F_v$: in this way the force of this spring 20 contributes to slightly raising the seat during unlocking manoeuvres, which relieves in proportion the cam mechanism.

The degree of contribution of spring 20 to this lifting force may be adjusted beforehand by modifying the position of lug 25 in relation to axis B.

Lug 23 is advantageously bent so as to have a portion 26 jointingly extending along the face, of flange 1, the furthest removed from flange 3: this measure completes efficiently the relative axial guiding of both flanges 1 and 3.

As is evident and as it follows moreover already from what has gone before, the invention is in no wise limited to those of its embodiments and modes of application which have been more especially considered; it embraces, on the contrary, all variations thereof, particularly those where the control by rotary cam is of a type other than that mentioned hereabove.

What is claimed is:

1. A seat hinge for connecting, in an angularly adjustable fashion about a transverse horizontal axis, the back of a seat to the sitting portion of the seat, said hinge comprising: a first flange integral with the sitting portion and carrying a first toothed sector centered on a transverse horizontal axis A; a second flange integral with the seat back and carrying a second toothed sector centered on an axis B connected with the seat back and extending parallel to axis A, said second sector being engageable with and disengageable from the first sector in response to movement of the two axes A and B towards and away from coincidence, said second flange being provided with an opening therethrough centered on axis B; a hub housed in said opening integral with a rotary cam; a control handle accessible, in use, to a person seated on the seat and connected to the cam so that operation of said handle causes rotation of the cam about axis B; a bearing surface provided on the first flange for coacting with an active area of the rotary cam so that rotation of said cam causes movement of the second flange; and a spring angularly urging the cam and the handle in the direction which corresponds to the mutual engagement of the two toothed sectors, said hinge further comprising a third toothed sector centered on axis A and carried by the first flange so as to be diametrically opposed to the first sector and to face generally in the same direction as this first sector; and a fourth toothed sector centered on axis B and carried by the second flange so as to be diametrically opposed to the second sector (4) and generally to face in the same direction as said second sector, said fourth sector being engageable with and disengageable from said third sector in response to movement of the two axes A and B towards and away from coincidence.

2. A seat hinge according to claim 1, wherein the sets of teeth of the first and third sectors face generally upwardly and those of the two other sectors face generally downwardly.

3. A seat hinge according to any one of claims 1 and 2, wherein the radii of all the sectors are identical.

4. A seat hinge according to claim 1, wherein two of the diametrically opposed toothed sectors are formed by respectively a recessed inner section and a projecting outer section of the same circular set of teeth formed by semi-stamping in the corresponding flange, said semi-stamping providing a recessed half set of teeth on one of the two faces of the corresponding flange and a projecting half set of teeth on the other face thereof.

5. A seat hinge according to claim 4, wherein the two diametrically opposed toothed sectors formed by a recessed section and a projecting section of the same semi-stamped circular set of teeth are those carried by the second flange.

6. A seat hinge according to claim 1, wherein one of the third and fourth toothed sectors is formed in the free end of a lug carried by the corresponding flange and overlapping a section of the other flange.

7. A seat hinge according to claim 6, wherein the lug is carried by the first flange.

8. A seat hinge according to claim 1, further comprising a spiral leaf spring angularly urging the seat back in a forward direction, the inner end of said spiral leaf spring being hooked on to a core connected to the second flange and the outer end of said spiral leaf spring being hooked on to a lug carried by the first flange at a location thereof such that the angular urging exerted by said spiral leaf spring has a component tending to lift said second flange.

9. A seat hinge according to claim 8, wherein the core is mounted loose on a shaft of the hinge and interlocked with the second flange by means of a bent lug a portion of which extends jointingly along the first flange.

* * * * *